United States Patent [19]

Kolbe

[11] 3,901,529
[45] Aug. 26, 1975

[54] VEHICLE BANKING ARM CONSTRUCTION

[76] Inventor: Joachim Kolbe, 5126 Haskell Ave., Encino, Calif. 91316

[22] Filed: Sept. 27, 1974

[21] Appl. No.: 509,830

[52] U.S. Cl. .......................... 280/112 A; 267/57.1 A
[51] Int. Cl.² ........................................... B60G 7/04
[58] Field of Search ........ 280/112 R, 112 A, 124 B, 280/96.2 R; 267/57, 57.1 R, 57.1 A

[56] References Cited
UNITED STATES PATENTS

| | | | |
|---|---|---|---|
| 3,726,542 | 4/1973 | Kolbe | 280/112 A |
| 3,851,893 | 12/1974 | Kolbe | 280/112 A |

*Primary Examiner*—Philip Goodman
*Assistant Examiner*—John A. Carroll
*Attorney, Agent, or Firm*—Andrus, Sceales, Starke & Sawall

[57] ABSTRACT

The pivotal connections carried by the superstructure are placed along the respective banking arm axes viewed from above. Where two multiturn cushions are employed, the individual center point of rotation for one cushion of the related pair of multiturn cushions of the respective banking arm is located along said respective banking arm axis a selected distance above, and the center point of rotation for the other cushion of the related pair is located a selected distance below said banking arm axis. All multiturn cushions and related pivotal banking arm connections are simultaneously placed a substantially equal distance above the roadbed, with the cushions extending approximately parallel to the superstructure floor both in vehicle static height position and during curvebanking of the superstructure.

11 Claims, 5 Drawing Figures

VEHICLE BANKING ARM CONSTRUCTION

CROSS-REFERENCE TO RELATED APPLICATIONS

For earlier forms of banking arms to which the present invention may be applied, reference is made to U.S. Pat. No. 3,826,514 (Single Leaf Truss), U.S. application Ser. No. 324,754, filed Jan. 18, 1973 (Torque Control Pivot), U.S. application Ser. No. 381,991, filed July 23, 1973 (Reverse Geometry), now Pat. No. 3,851,893 and U.S. application Ser. No. 451,744, filed Mar. 18, 1974 (Cushion Pairs), by the present inventor.

BACKGROUND OF THE INVENTION

1. Field of the Invention:

This invention pertains to a vehicle banking arm construction for automotive vehicles and the like, and in particular to an improved vehicle arm construction for resiliently supporting the superstructure of curvebank cars to secure inward lean of the superstructure during curve ride of the vehicle. The subject matter of this invention constitutes a new solution to the problem of creating a secondary effective banking roll center, located in height of the center of mass of the superstructure and about which the vehicle superstructure can rotate when moving into its desired inwardly inclined position, as it does in the structures cited in the above applications, but there achieved by structural means different from the structure herein disclosed. Besides other advantages, an even lower and flatter floor panel for the superstructure and therewith a lower vehicle can be constructed.

A further improved performance of the vehicle resilient means, resulting from the new arrangement, contributes to the creation of a safer vehile running gear, capable of absorbing the many forces active on an automobile during straight ahead and during curve ride, with less disturbance for the superstructure and its passengers.

2. Description of the Prior Art:

The history of the developement of curvebank cars, for which this inventor is to a substantial degree responsible, started, after initial efforts to construct a true pendulum vehicle, with the building of a structure comprising pairs of support links, arranged inclined to each other and placed between the vehicle superstructure and individual front and rear subframes to which the individual wheel suspensions were attached whereby each pair of inclined links operated in a vertical plane. The resulting structure reached high into what presently constitutes the engine compartment in the front and the passenger compartment in the rear of the vehicle.

A second step in the development of curvebank cars was the incorporation of large inclined banking hinges, the axes of which intersected the axes of equally large control arm suspension hinges, to form so-called banking universal joints. The inclined banking hinges, carried by the frame and operating in planes inclined relative to the roadbed did not extend as far into the superstructure as the previous links, but in both cases the positioning of improved vehicle engines, built shorter but higher and wider than those built in earlier years and positioned farther forwardly in the vehicle made the placing of the banking structure possible only by elongating and widening the over-all vehicle dimensions.

An important step forward was the replacing of the actual banking universal joints with so-called effective banking universal joints, each composed of a single ball socket joint, and initially, a rubber cushion connected by a guide member with said ball and socket joint. A longitudinally extending connecting link, preferably torsionally resilient in structure, connected the superstructure with a respective axle-carried support member.

A banking arm so constructed was substantially lower and operated in an essentially horizontally extending district. The highest parts in the assembly were the rubber and later on polyurethane-based cushions, thereafter called multiturn cushions. Constructed as rectangular blocks, these cushions had to be of substantial length and height and were individually positioned inclined up to 45° relative to the roadbed.

U.S. Pat. No. 3,181,883, issued May 4, 1965, (Rubber Cushions), U.S. Pat. No. 3,556,553, issued Jan. 19, 1971, (Polyurethane Cushions), and U.S. Pat. No. 3,726,542, issued Apr. 10, 1973, (Rigid Front Axle), are patents granted to this inventor and which disclose banking arm structures of substantially reduced height, when compared with the above-described earlier structures.

The cross-references cited above disclose the results of continued efforts by this inventor to find lower profile banking arms, especially in light of the growth of the small or compact car market. In each case, special additional performance features were disclosed in these patents.

U.S. Pat. No. 3,826,514 (Single Leaf Truss), discloses a structure which reduced the weight and space and especially the height needed for the longitudinally extending resilient means, forming a part of the banking arm structure, by about 40%

U.S. application Ser. No. 324,754, (Torque Control Pivot), discloses a structure which eliminates the need for upper longitudinally extending torque control arm altogether and thereby makes space available for use of the passengers and the engine and its accessories.

U.S. application Ser. No. 381,991 (Reverse Geometry), discloses a proposal to solve the height problem for the installation of banking arms, by offering an extended geometry pattern so as to have the placing of the related multiturn cushions coincide with space available beneath the superstructure passenger seats.

U.S. application Ser. No. 451,744 (Cushion Pairs), relates to a combination of the structural arrangements of the applications enumerated and shortly described above, which make possible the reduction in height of the banking arm profile at its highest extension by approximately 50%.

SUMMARY OF INVENTION

This invention is based on the discovery that it is advantageous to dispose the multiturn cushion or cushions between the banking arm structure and the superstructure of the vehicle at a position where its arcuate path of movement with relation to the inclined banking axis passing through the center of the corresponding ball and socket joint is in the sector either above or below the banking axis.

For this purpose each multiturn cushion should be supported upon an arm of the banking arm structure extending from the ball and socket joint either rearwardly and outwardly of the vehicle or forwardly and inwardly, and generally in the vertical plane of the banking axis.

Where a pair of multiturn cushions is employed, it is advantageous to give each single cushion of the related pair its own point of banking rotation center along the outline of the related inclined banking axis in a selected position, distant from the related center of the banking arm ball and socket joint, through which the banking axis also extends.

The centers of the two multiturn cushions comprising the pair, each are placed, together with the center of the related superstructure carried banking arm ball joint into the vertically extending plane comprising the inclined banking axis and the projection of said banking axis onto the horizontally extending roadbed. In selecting one point of rotation center for the related cushion a selected distance above the ball and socket joint center, the other point or rotation for the other cushion a selected distance below said ball and socket joint center, both multiturn cushions of the related pair will extend and travel essentially parallel or nearly parallel to the floor panel of the passenger compartment, securing a minimum of vertical space need for both positioning and operation of the multiturn cushions under all wheel oscillation and superstructure banking travel conditions.

BRIEF DESCRIPTION OF THE DRAWINGS

The accompanying drawings illustrate the best mode presently contemplated of carrying out the invention.

In the drawings.

DESCRIPTION OF THE PREFERRED EMBODIMENT

Figure 1:
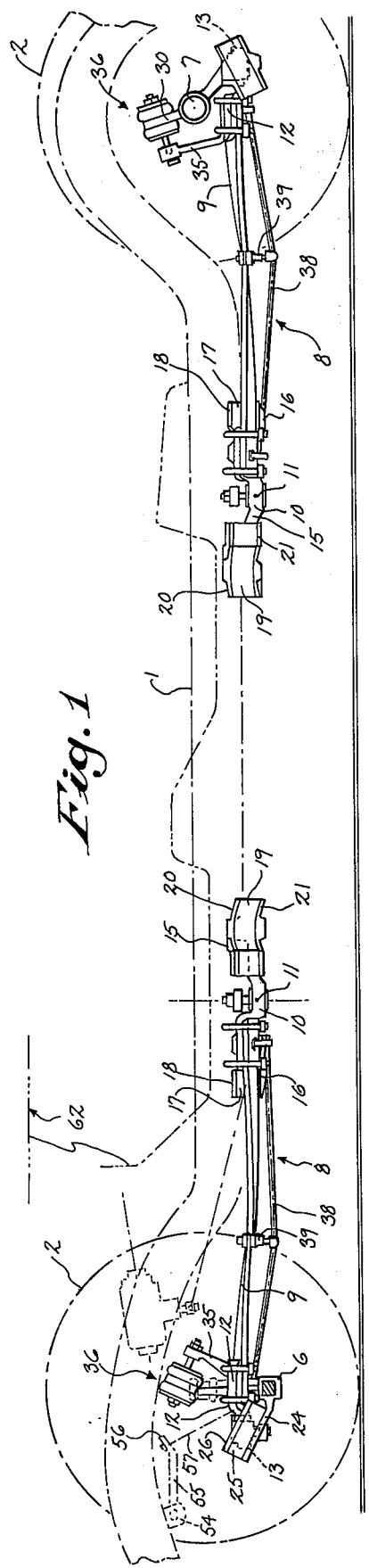
FIG. 1 is a side elevation of a banking arm supported vehicle superstructure including front and rear rigid axles and illustrating the multiturn cushions carried by the superstructure and those carried by the axles placed in accordance with this invention.
Figure 2:
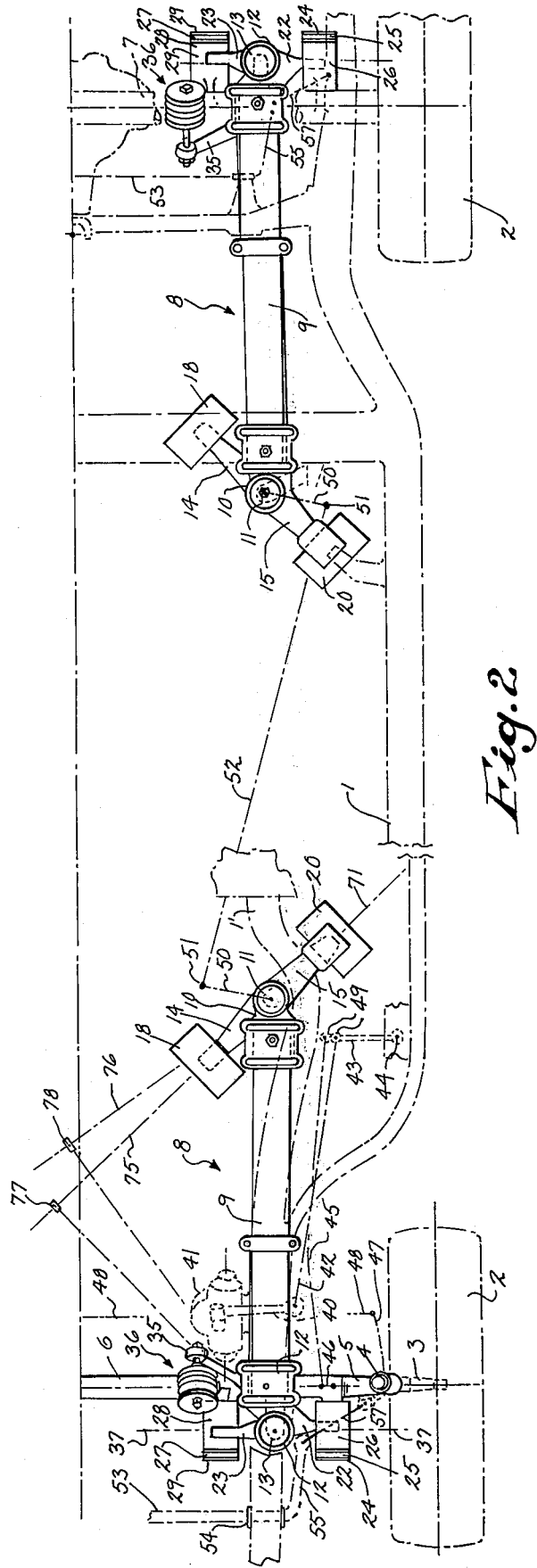
FIG. 2 is a half-section of the curvebank vehicle chassis structure shown in FIG. 1, as it appears in top view in its static upright height position.

FIGS. 1 and 2 illustrate in side view and in top view perspectively a vehicle superstructure having a chassis or body support frame 1 supported by the wheels 2. The lefthand half only of the vehicle is shown in top view and assumed to be essentially mirror-like to the respective right-hand. The wheels 2 are arranged in pairs, one pair at the front and the other pair at the end of the vehicle. The wheels of each pair are disposed on opposite sides of the superstructure and are equally spaced from the longitudinal, vertical center plane of the vehicle.

The front wheels 2 are each in the modification illustrated, supported by a wheel spindle member 3 pivotally connected by a kingpin 4 to the outer, elevated end 5 of a rigid front axle 6 extending transversely between the two front wheels 2.

The rear wheels 2 are carrying a rigid axle housing structure 7. The front axle 6 and the rear axle housing structure 7 each are supporting the respective ends of a related pair of banking arms 8 which are supported at their other ends by the frame 1.

Each banking arm comprises a torsionally operated leaf spring 9 preferably in form of a single leaf connected at one end by a support bracket 10 for the support of the banking arm ball and socket joint 11, which connects said end of the banking arm 8 to the frame 1. The other end of the respective leaf spring 9 is held by the support bracket 12 for the support of the banking arm ball and socket joint 13, which connects said end of the banking arm 8 to the rigid axle 6 in the front, and to the rigid axle housing structure 7 in the rear of the vehicle, respectively.

Each support bracket 10 extends substantially horizontally and diagonally away from the related ball and socket joint 11 in both directions along the vertical plane of the banking axis (described hereinafter), forming two support half-arms 14 and 15, whereby the half-arm 14 extends from the ball joint 11 inwardly toward the wheel 2 located at the other side of the vehicle, while the other support half-arm 15 extends along the extension of the support half-arm 14 outwardly and backwardly towards the outer center district of the vehicle.

Each support half-arm 14 is shaped at its end into an operating plate 16 which supports from below a multiturn cushion 17 of substantially rectangular but somewhat bend-sectional outline and positioned essentially parallel to the roadbed and inclined to the longitudinally and vertically extending center plane of the vehicle at an angle of approximately 47° as measured between its long side and the vehicle center plane. An upper carrier plate 18 covers the multiturn cushion 17 from above and is carried by the frame 1.

A second multiturn cushion 19, supported from above by an operating plate 20 on arm 15 and carried from below by a carrier plate 21 on frame 1 is positioned at the end of the support half-arm 15 with all related short edges of the cushion 19 extending parallel to those of the multiturn cushion 17. The related longitudinally extending edge lines of the cushions 17 and 19 have their bend-sectional outlines arranged in opposite direction relative to each other. The distance between the centers of the multiturn cushions 17 and 19 is generally between one-third and one-half of the distance between the ball joints 11 and 13, with the ball joint 11 preferably placed at an equal distance between the cushions 17 and 19. The cushions 17 and 19 are referred to hereinafter as "bent cushion pairs."

Each support axle bracket 12 extends substantially horizontally and transversely away from the related ball and socket joint 13 in both directions forming two support half-arms 22 and 23 whereby the half-arm 22 extends from the ball joint 13 outwardly towards the nearest wheel 2 while the half-arm 23 extends inwardly towards the center district of the respective rigid axle 6, and 7.

Each support half-arm 22 is shaped at its outer end into an operating plate 24 against which the multiturn cushion 25, formed into a substantially rectangular shape rests from above. The cushion 25 extends as appearing in side view, with its longer side longitudinally of the vehicle and is positioned inclined to the road at an angle of approximately 30°, with the lower edge of its lower surface placed somewhat closer to the respective axle 6 and 7 than its respective upper edge. A carrier plate 26 engages the multiturn cushion 25 from above and is carried by the respective axle 6, 7.

The support half-arm 23 engagaes a second multiturn cushion 27, of identical shape and inclination as the cushion 25, at its outer end from above through the operating plate 28. The muliturn cushion 27 is resting on the carrier plate 29, which supports the cushion 27 from below and is itself supported by the respective axle 6, 7. The distance between the centers of the multiturn cushions 25 and 27 is generally between 1/4 to 1/3 of the distance between the ball and socket joints 11 and 13 with the ball joint 13 preferably placed at an equal distance between the cushions 25 and 27, which are referred to hereinafter simply as "cushion pairs".

Each axle 6 and 7 carries up upwardly directed arm 30 which supports at its ring-formed upper end two bushings of resilient material 31 which are resting between the two enclosure discs 32 and which are kept under pressure by a bolt 33 with corresponding regulatory end nuts 34. Each support bracket 12 also carries an upwardly directed arm 35 which pivotally receives at its upper end the extended bolt 33. The pivotal assembly as a whole constitutes a so-called torque control pivot 36 which is selectively positioned to control any tendency of the related axle to rotate about its axis line 37 interconnecting the centers of the respective two multiturn cushions 25 and 27 supported by the related axles in responses to vertically directed wheel reaction forces.

The control pivots, arranged to replace upper axle torque control rods, when the latter are not desired, transmit these forces by means of the related leaf springs 9 and the support brackets 10 to the frame 1. Torque control pivots and their functions are disclosed in the pending U.S. application Ser. No. 324,754, referred to above.

The tendency of the torsionally operated leaf springs 9 to bend in reaction to forces present in the system is overcome or controlled by the addition of a truss cable 38 arranged below and extending between the respective support brackets 10 and 12 for each spring leaf, whereby a truss column 39 is positioned between the spring leaf 9 and the truss cable 38, as described and claimed in U.S. Pat. No. 3,826,514. The exact positioning of the truss column 39 depends on the desired amount of bending deflection needed to have the torque control pivot 36 control the caster or upright position of the axle in static height suspension position and also during wheel oscillation and during curve banking of the superstructure.

FIG. 2 further illustrates, schematically only, the front wheel steering linkage for a curvebank vehicle having a rigid front axle. The steering linkage comprises the horizontally extending lever 40 which might be considered the Pitman arm of the steering gear mechanism enclosed by a gear housing 41 mounted on the frame 1 to locate the arm as illustrated.

The outwardly extending lever arm 40 is pivotally connected at its outer end to a tie-rod 42 supported by the lever arm 43 which is pivotally supported by the vertically extending pivot 44 carried by frame 1. The lever arm 43 also carries the backward end of the steering draglink 45 whose forward end is connected to the spindle arm 46. The steering arm 47 integral with the spindle and arm 46 supports cross steering tie-rod 48 extending between the steering arm 47 and the corresponding steering arm located on the other side of the vehicle. All tie-roe and drag-link ends are connected to their respective support arms by ball socket joints 49.

Each of the two support brackets 10 located on one side of the vehicle also carry an arm 50 sidewardly extending in a direction opposite to each other in relation to the two ed sections of the vehicle, whereby each of said arms carries a ball and socket joint 51 on its free end, supporting the ends of a front to rear tie-rod 52 arranged to secure lateral operation in unison of the front and rear pairs of banking arms 8 during the roll turn of the superstructure into a banked position.

Figure 3:
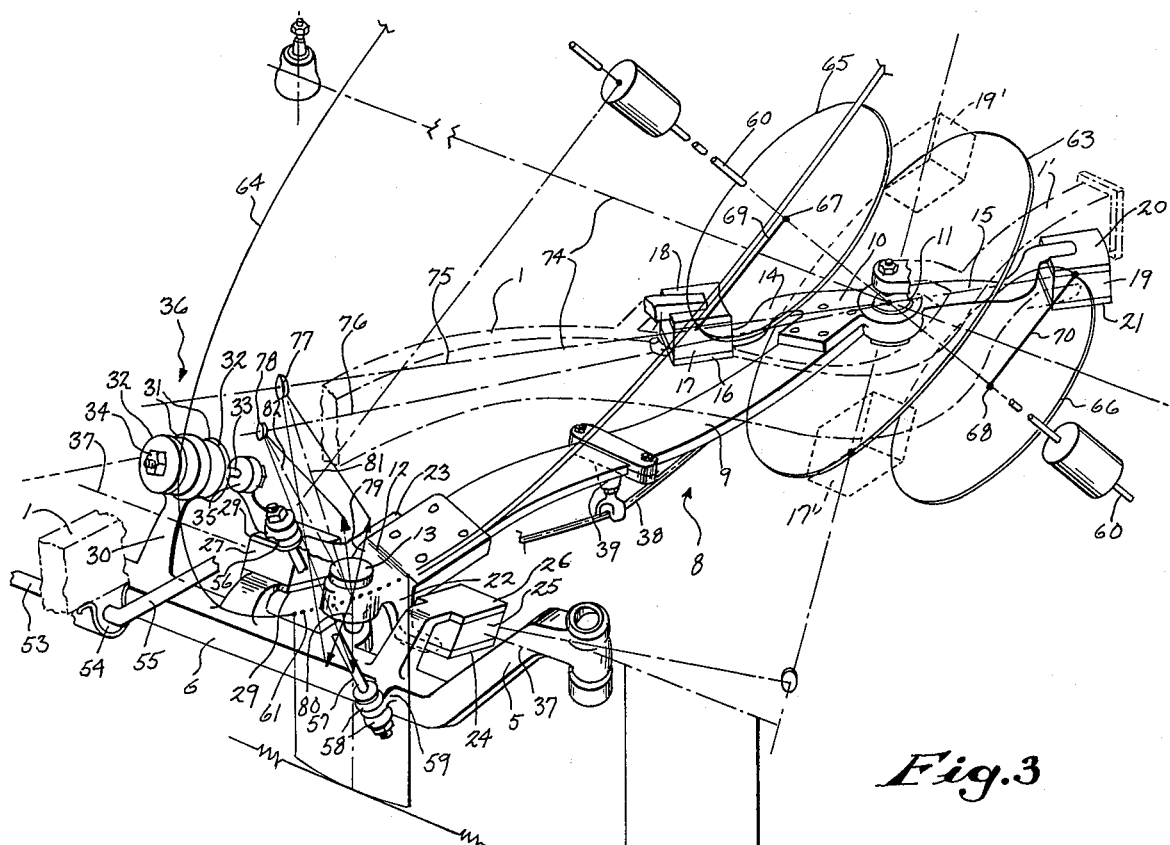
FIG. 3 is a detailed perspective view of a left-hand vehicle front end banking arm as shown in FIGS. 1 and 2, and illustrating both the respective axle and superstructure supported pairs of multiturn cushions, placed to fit into the related curvebank arm geometry pattern illustrated.

Each frame end supports a sway bar 53, as illustrated in FIGS. 1 to 3 in bushings 54, with the londitudinally extending sway bar arms 55 connected by the resilient bushings 56 at their upper ends to the sway bar shackies 57 which are connected by the resilient bushings 58 at their lower ends to the respective axle carried support bracket 59 as shown in FIG. 3.

FIG. 3 illustrates in perspective outline the left front banking arm 8 and its support structure as shown in FIGS. 1 and 2 and fitted into the geometric pattern developed for the banking arm to perform the many functions the mechanism is capable of. Differing from FIGS. 1 and 2, the front axle 6 here is shown as positioned a selected distance rearwardly of the related banking arm ball and socket joints 13.

The dominating factor of the banking arm system is the carefully selected position of the banking arm axis 60 shown in a distinct outline in FIG. 3 extending between two small cylinders, which allows a clear reading of its position relative to the three main planes of the vehicle. The structural elements shown are given the numerals selected for FIGS. 1 and 2.

The vehicle front axle 6, supported by the wheels 2 carries the front banking arm ball joints 13 which in turn carry the support bracket 12 connected to the front end of the corresponding torsionally operated leaf springs 9. The rearward end of the spring 9 is connected to the support bracket 10 which carries the banking arm ball and socket 11 in turn supported by the vehicle frame 1.

Figure 4:
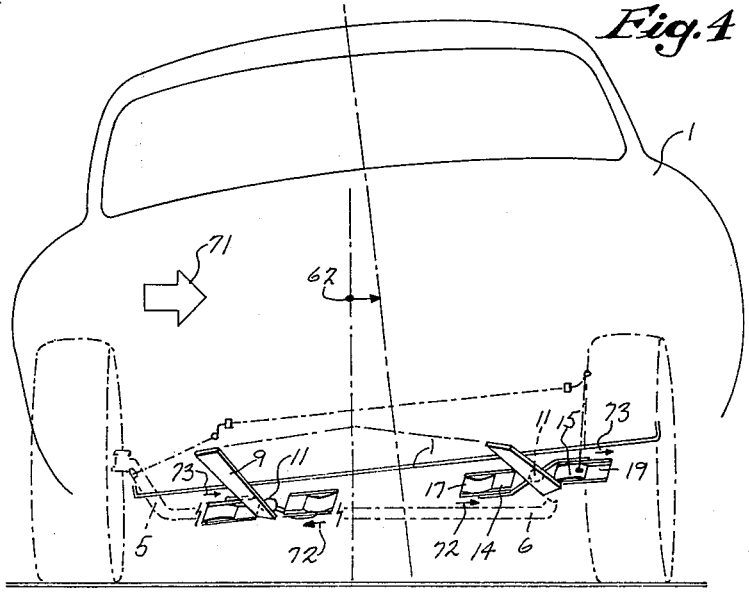
FIG. 4 is a schematic front elevation of the front end of the vehicle having its superstructure mounted as shown in FIGS. 1 and 2 and turned into a roll banked position, and in particular illustrating the positions thereby taken by the superstructure supported multiturn cushions pairs and by the torsionally operated related spring leaves.

The banking arm axis 60 is determined in its position by the positioning of the multiturn cushions 17 and 19 relative to the selected position of the ball joint 11 through which the bankiing arm axis extends. The inclinations of the banking axis 60 relative to the three main vehicle planes determine the travel path 61 for the ball joint 13 which, in combination with the mirror-like travel path for the related ball joint 13 located on the other side of the vehicle determine, under consideration of the respective torsional leaf spring deflections as they occur during vehicle curve ride, the position of the secondary roll center 62 as shown in FIG. 4 and which coincides in its location with the mass center of the superstructure and about which the superstructure can easily turn relatively during curve ride and move into its desired position inclined towards the inside of the curve.

Referring to the above-cited application Ser. No. 451,744, FIG. 3 of this invention illustrates in dotted outline the two multiturn cushions 17', 19' positioned to ineffect during shear deformation travel along the periphery of a circular line 63 appearing in FIG. 3 as an ellipse positioned at 90 degrees relative to the banking axis outline 60.

The travel path 61 for the ball joint 13 is illustrated along the periphery of in effect a circular outline 64, whose center is also located along the banking axis 60, and in particular along that section of the circular outline 61 which has the minimum of longitudinal change in its distance from the axle 6 during the lateral and vertical travel displacements, as well as an equal longitudinal change on both sides of the vehicle during the curvebank turn of the superstructure, however small this longitudinal change might be. True transverse position of the axle 6 both during vehicle straight ahead ride and during curveride is thereby secured.

The subject matter of this invention is based on the discovery that a placing of the multiturn cushions 17' and 19' into more horizontal positions both while stationary and during the banking turn of the superstructure is possible, since the essentially horizontally extending sections of the circular outline 63, located near the respective lowest and highest points of the outline 63 give the advantage of horizontal travel paths, although they are still positioned at a substantially unequal distance above the roadbed.

By providing two separate peripherical outlines 65 and 66, one for each multiturn cushion 17 and 19, and by selecting a center point of rotation 67 along the banking axis 60 for the cushion 17 a selected distance above the center of the ball and socket joint 11, and a corresponding separate center point of rotation 68 for the cushion 19 along the banking axis 60 a selected distance below the center of the ball and socket joint 11 the geometry pattern can be coordinated so as to secure equal distance from the roadbed for the cushion centers 17 and 19 and the ball joint center 11. The respective operating plates 16 and 20 of the multiturn cushions 17 and 19 will now move simultaneously in the same direction clockwise during the superstructure banking turn caused shear defomration of the cushions and the designed inclinations of the banking arm axis 60 are therefore maintained. The cushion 17 has as its radius for the turn the outline 69, and the cushion 19 has the outline 70.

The desired travel path for the ball and socket joint 13 along the circular outline 64 is therefore also secured.

In the operation of the novel arrangement of the multiturn cushions in accordance with this invention very important differences in the torsional windup of the leaf springs 9 and the resulting effects on the size and direction of the vehicle support forces as distributed by all related resilient means, and particularly by the leaf springs 9 have to be considered.

Since the cushion 17 being located longitudinally closer to the respective axle 6 than the cushion 19 and since the upper carrier plates 18 covering the cushions 17 and carried by the frame 1 resist participation on the upward movement of the neighboring section of the leaf spring 9, whenever the axle 6 moves upwardly, a clock-wise windup of the frame supported end of the leaf spring 9 will occur, as viewed by the driver within the left-hand front banking arm.

The multiturn cushion 19 will try to lower itself whenever the front end of the axle 6 moves upwardly, but will be resisted therefrom by the frame supported carrier plate 21 and also torsionally windup the frame supported end of the leaf spring 9 clock-wise as viewed by the driver.

This clock-wise windup of the leaf spring 9 whenever the axle 6 moves up has the following effects: during the lifting of the front axle 6 of the vehicle from zero to static height, such clockwise frame supported spring and windup will occur within the lefthand banking arm illustrated in FIG. 3, and a counter-clockwise windup of the related spring end will occur within the righthand banking arm located on the other side of the vehicle. For the vehicle static height position one-half of the necessary leaf spring angular windup is assigned to the frame supported end of the related leaf, the other half to the axle supported end of the leaf spring.

The related cushion operating plates 24 and 28 forming the outer ends of the corresponding arms 22 and 23 of support bracket 12 are designed accordingly, resting against the axle supported multiturn cushions for the cushion 25 from below and for the cushion 27 from above and held under pressure from the torsionally wound up leaf springs. The multiturn cushions 25 and 27 have their loads transferred to the outer ends of the axle 6 through the carrier plates 26 and 29 respectively.

During the static height position of the superstructure, the front end of the leaf spring 9 is for the illustrated front left-hand banking arm wound up counter-clockwise as viewed by the driver, and that of the spring leaf for the right-hand front banking arm is wound up clockwise.

Any further lifting of the axle 6 as a whole will continue to wind up the related two spring leaves from the superstructure end in their respective directions.

However, contrary to directional windups described for the comparable previous disclosures, a basic change in the direction of windup of the front ends of the leaf springs will occur whenever a single front wheel only, such as the left-hand front wheel shown in FIG. 3, will lift itself upwardly. Under that condition, the front axle 6 will take a position inclined to the roadbed and simultaneously unwind the front end of the left-hand leaf spring located nearest the lifted wheel, while additionally winding up the front end of the right-hand spring leaf located on the other side of the vehicle.

Should the right-hand wheel located on the other side of the vehicle move out of its static height position downwardly, and additional wind-down will occur from the front end of the left-hand leaf spring 9, which already lost some of its static height torsional wind-up, caused by the neighboring wheel lift while the front end of the right-hand spring leaf on the opposite side of the vehicle will additionally be wound up, since the axle 6 will be in a position of an even larger inclination than before.

Actually, this behavior of the front end of the suspension system can be regarded as of substantial value. In effect the left front wheel, as shown in FIG. 3, will find reduced resistance against taking its elevated position while rolling over an obstacle in the road, while part of the load normally carried by said wheel is now carried by the wheel located on the other right-hand side of the vehicle and which is not forced out of its position, and is able to carry that additional load without disturbance. A softer, but nevertheless firmer ride can be expected.

Giving a more complete picture for the one wheel up condition: (1) The leaf spring 9 will be wound up from its superstructure supported end. (2) The leaf spring 9 will be wound down from its axle supported end. (3) The sway bar effect will give as is normal, additional resistance against wheel lift. (4) The polyurethane neighboring cushions activated in shear deformation will cause progressively increasing resistance, as described hereinafter, as well as described in the disclosures U.S. Pat. No. 3,556,553 (Polyurethane) and U.S. Pat. No. 3,726,542 (Rigid axle).

During the curve ride, both sides of the vehicle will be influenced by the described additions and subtractions to static resistances, resulting in a given shift of the superstructure mass center towards the outside of the curve. This mass shift is activated during the banking roll turn of the superstructure, assisted by the sway bar shackles, lifting the superstructure on the curve outside and pulling it down on the curve inside. However, during that period of mass shift and roll banking, the torsional degree of leaf spring windup is further affected with application of the structural members in accordance with this invention, stiffening the curve outside resilient support and softening the curve inside support in the arrangement of this suspension. In effect, in curve bank cars of the present invention, the vehicle frame will lift away from the axle on the curve outside and lower toward the axle on the curve inside, thereby in effect reversing the described one wheel-up, the other wheel-down, spring wind-up forces and securing additional superstructure lift on the curve outside and lowering on the curve inside, resulting in the desired true inward lean of the superstructure.

The amount of this change in spring windup can be further controlled by the selected position and in particular inclination of the axle supported polyurethane cushions 25, 27, as disclosed in the U.S. Pat. No. 3,181,883 (Rubber cushions).

FIG. 4 shows the superstructure 1 as pressed into the inwardly inclined position, such as during a turn of the vehicle to the right and while under the side pressure from the centrifugal force as represented by the arrow 71. The positions taken by the leaf springs 9 are shown as following with the backward ends the roll motion of the superstructure 1, while the forward ends essentially maintain their relationship to the front axle. The shear deformation of the superstructure carried multiturn cushions 17 and 19 is shown, as well as (schematically) the support brackets 10 extending from the related ball joint 11 sidewardly in both directions over the bracket half-arms 14 and 15 to the upper and lower operating plates 16 and 20 and the lower and upper carrying plates 18 and 21. The plate 16 for instance, located on the right side of the left-hand front banking arm, as viewed from the driver, has moved inwardly, as indicated by the small arrow 72, relative to its related superstructure carried plate 18, and the plate 20, located on the left side has moved outwardly relative to its related superstructure carried plate 21 as indicated by the small arrow 73, while the centers of the cushions 17 and 19 have traveled along the respective circular arcs 65 and 66 as shown in FIG. 3.

A torque control pivot 36, such as shown in FIGS. 1, 2 and 3, is not shown in FIG. 4, but the positioning of the multiturn cushions 17 and 19 in accordance with this invention will lead to a similar "S-ing" of the spring leaf 9 with coordinated placing of the truss cable column 39 as described in the single leaf case, U.S. Patent application Ser. No. 324,754.

Having described all structure illustrated in FIGS. 1 to 4, reference is now made to one highly desirable feature which was present in the banking arm arrangements comprising polyurethane cushions during wheel oscillation in form of strong shear deformation of the related multiturn cushions as disclosed in the U.S. Pat. No. 3,556,553, issued Jan. 9, 1971, and the cited cross-references to the related applications issued to and applied for by this inventor.

The muliturn cushions in these earlier structures were not only activated in shear deformation during the curvebank roll process of the superstructure but were always, and sometimes even to nearly as large an extent, activated during normal wheel oscillation. Such shear deformation of the cushions occured whenever the axle supported ball joint of the related banking arm during wheel up or down movement caused a turn of the banking arm about its related banking arm axis 60, which then too extended generally inclined to the roadbed and to both the transversely and the longitudinally extending main planes of the vehicle. Since the banking arm axis supported by the superstructure constituted one axis of the effective banking arm universal joint, wherein the other axis of the universal joint was created by the connecting line between the center of the frame supported banking arm ball joint and the related multiturn cushion, the axle supported banking arm ball joint would try to turn during its respective wheel oscillation movements about said other substantially horizontally extending axis of the described effective universal joint. If for instance a banking arm were blocked from turning about its related banking arm axis altogether, the axle supported ball joint, with two travel arcs, spreading away from each other would soon find opposition to any vertical movement of the ball joint. The difference between the two paths along which the axle supported banking arm ball joint tries to travel in a substantially vertically extending transverse plane during wheel oscillation and along which it would be forced to turn while turning about the substantially horizontally extending axis of the effective banking arm universal joint was bridged by the related frame supported multiturn cushion and its ability of shear deformation.

In the previous disclosures related to this specific subject matter of cushion operation, the described two travel paths wander sidewardly away from each other during both upward and downward movement of the related axle supported banking arm ball joint, (as shown in the "Rigid Front Axle" Patent) one path having as its center of travel essentially the center of the rigid axle, the other path a point constituting the shortest distance between said ball joint and the line extending from the center of the related frame supported banking arm ball joint diagonally outwardly and through the center of the related multiturn cushion.

In the banking arm structure of the present invention, the banking arm axis 60 will be the same in position and inclination as in previous banking arm structures referred to above and forming one axis of the related banking arm universal joint 74, the other essentially horizontally extending axis 75 of the effective universal joint 74, determined by the positions of the center of the frame supported banking arm ball joint 11 and the selected positions of the two related multiturn cushions 17 and 19, now extends from the ball joint forwardly-inwardly and backwardly-outwardly.

The oscillation-turning axis 76 for the related axle supported banking arm ball joint 13 extends for a one wheel up and down movement from the related frame supported banking arm ball and socket joint 11 downwardly and sidewardly towards the wheel to road contact point located on the other side of the vehicle.

The axes 76 and 75 are therefore located on the same side of the related banking arm, where in previous applications they were on opposite sides. Connecting the center of the axle supported banking arm ball joint 13 with the points of nearest distance 77 and 78 along the axes 75 and 76 respectively shows that the point 78 along the axes 76 is located nearer to the roadbed than the point 77, located along the axis line 75. The related travel arcs 79 and 80 are leaving the center of the related axle supported ball joint 13 under different angles, both during up as well as during downward movement. Although the related radii 81 and 82 are only of a small difference in length, this difference in angular position of the arcs 79 and 80 creates the desired gap to be bridged during wheel oscillation by the operation of the related multiturn cushion in shear deformation.

The importance of such shear deflection is the fact that it is accompanied by a corresponding turn of the banking arm universal joint 74 about its related frame supported banking arm axis 60 and that such turn creates a corresponding turn of all banking arms, although to a diminishing extent about both the frame supported banking arm ball joints and even about their axle supported ball joints. The whole structural vehicle suspension system is thereby thoroughly vibration dampened and the multiturn cushions act, in combination additionally as secondary resilient control means contributing to the improvement of the variable rate spring action, secured by the primary resilient control means, the torsionally operated longitudinally extending leaf springs 9, which form the essential main part of the related banking arms.

This invention disclosure illustrates and describes a further variation in the arrangement of the few structural elements still needed only to create banking arms, which are characterized by the lowest profile yet achieved for such arms, not only during their static height position but additionally during the wheel oscillation and the roll banking arm turns. Maximum space availability for the vehicle passenger compartments can therefore be maintained after incorporation of the banking arms into automobiles. All features and advantages previously developed by this inventor are maintained and new ones such as the described support force transfer from one side of the vehicle to the other have been added.

The distance of each multiturn cushion of the related pair of cushions relative to the corresponding banking arm ball joint can be a selective one, as long as the balance of the product of equality of force times related lever arm is maintained.

Finally, there are choices available for the front end support of the torsionally operated leaf springs 9 on the respective axles, such as the combinations of one multiturn cushion only and a related ball and socket joint as shown in previous Kolbe disclosures referred to above.

Figure 5:
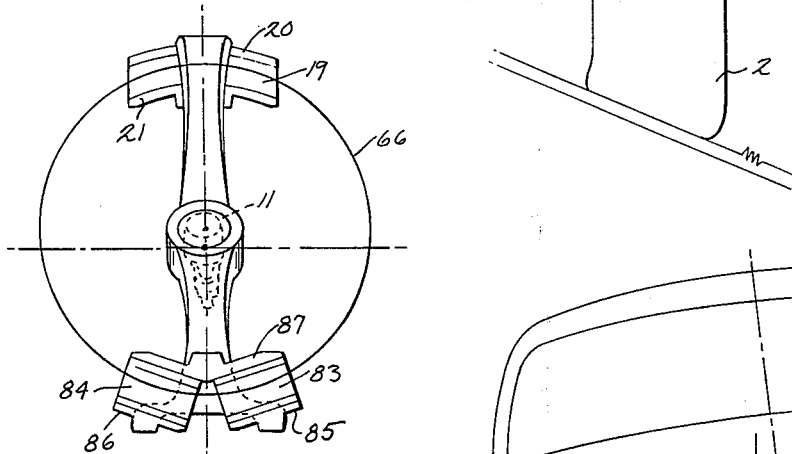
FIG. 5 is a schematic comparison illustration for two varying constructions of multiturn cushion assemblies.

FIG. 5 illustrates in somewhat diagramatic outline in its upper half a multiturn cushion assembly 19, such as that shown in FIGS. 1 to 4, including an upper operating plate 20 and a lower carrier plate 21, and positioned in relation to a pivotal connection 11 spaced a selected distance away from the cushion, which is bent-shaped to follow the circular travel path of the related peripherical outline 66. In the lower half of FIG. 5 a structural variation is illustrated, wherein two separate smaller multiturn cushions 83 and 84 are positioned inclined to each other, each with its own lower operating plate 85, 86, but both with a common upper carrier plate 87. This lower arrangement is considered to be a less expensive version for a multiturn cushion assembly since all curvature with its inherent fabrication restrictions has been avoided.

The adaptation of the present invention to the (cushion pair) construction of application Ser. No. 451,744, referred to above makes possible a very substantial reduction in the needed thickness of the multiturn cushions and also greatly conserves in vertical space requirements for the banking arms, features which are important in the application of banking arms to most passenger automobiles.

Where the invention is applied to trucks, camper vehicles and even to railway cars, where vetical space is more available for banking arms, it is possible to employ a single multiturn cushion of generally greater thickness for connecting the banking arm to the superstructure. This may be accomplished by merely eliminating either cushion 17 or 19 and enlarging the remaining cushion and increasing its lever arm by lengthening the corresponding arm 14 or 15. Such a construction retains substantially all of the advantages of the present invention.

In general, whereever in this disclosure banking arm ball and socket joints are illustrated and referred to, effective ball joint-like connections, especially where based on rubber or polyurethane connecting bushings and the like, should be considered equally acceptable within the link structures disclosed.

Various modes of carrying out the invention are contemplated as being within the scope of the following claims particularly pointing out and distinctly claiming the subject matter which is regarded as the invention.

I claim:

1. In a vehicle having a superstructure and a banking support connecting the superstructure, at its forward end to a wheel spindle carrying, wheel supported, rigid front axle structure, and at its rearward end to a wheel supported rigid rear axle structure, said banking support comprising a plurality of pairs of cooperating roll banking arms, each roll banking arm including a longitudinally extending torsionally operated resilient spring means connected by a separate support member and a ball and socket joint at one end to the superstructure and at the other end to the respective rigid axle structure, support half arms forming a part of said separate support members at the outer ends of said spring means and bearing at their outer ends against respective resilient multiturn cushions with the related ball joints and the multiturn cushions placed a selected distance longitudinally of the vehicle from the related axle structure, and support half arms forming a part of the related support members at the inner ends of said spring means bearing at their ends against respective multiturn cushions supported by the superstructure, wherein the improvement comprises for each roll banking arm the arranging of said superstructure supported support half arm forming a part of the related support member, and the related muliturn cushion carried thereby along an axis line extending in either direction diagonally from the related banking arm ball and socket joint and passing through the central district of the related axle structure.

2. In a vehicle having a superstructure and a banking support connecting the superstructure, at its forward end to a wheel spindle carrying, wheel supported, rigid front end to a wheel spindle carrying, wheel supported, rigid front axle structure, and at its rearward end to a wheel supported rigid rear axle structure, said banking support comprising a plurality of pairs of cooperating roll banking arms, each roll banking arm including a longitudinally extending torsionally operated resilient spring means connected by a separate support member and a ball and socket joint at one end to the superstructure and at the other end to the respective rigid axle structure, support half arms forming a part of said separate support members at the outer ends of said spring means and bearing at their outer ends against respective resilient multiturn cushions with the related ball joints and the multiturn cushions placed a selected distance longitudinally of the vehicle from the related axle structure, and support half arms forming a part of the related support members at the inner ends of said spring means bearing at their ends against respective multiturn cushions supported by the superstructure, wherein the improvement comprises the arranging of said superstructure supported support half arms forming a part of the related support member at the inner end of said spring means, and the related multiturn cushions carried thereby, in pairs, with the cushions of each pair disposed along an axis line extending in opposite directions diagonally from the related banking arm ball and socket joint and passing through the central district of the related rigid axle structure.

3. The vehicle of claim 2 wherein said outer support for the related banking arm comprises a pair of side lever arms each forming a part of the related support member and bearing at its outer end against a respective resilient multiturn cushion whereby the cushion of the pair placed nearest the wheel is carried by the related axle structure from above and supported for shear deformation operation by its related side arm carried operating plate from below, while the multiturn cushion placed nearest the central district of the rigid axle structure is carried by the related axle structure from below and supported for shear deformation by its related, side arm carried operating plate from above.

4. The vehicle of claim 2 wherein all superstructure supported multiturn cushions positioned in the central longitudinal district of the superstructure and more closely towards their related vehicle axles than the related banking arm ball and socket joints are carried from above by the superstructure and shear deformation operated by the related arms of the respective separate support members from below, while all frame supported multiturn cushions positioned in the outer and median sections of the vehicle and farther away from their related vehicle axles than the related banking arm ball and socket joints, are carried by the superstructure from below and shear deformation operated by the related arms of the respective separate support members from above.

5. The vehicle of claim 3, wherein all superstructure supported multiturn cushions positioned in the central longitudinal district of the superstructure and more closely towards their related vehicle axles than the related banking arm ball and socket joints are carried from above by the superstructure and shear deformation operated by the related arms of the respective separate support members from below, while all frame supported multiturn cushions positioned in the outer and median sections of the vehicle and farther away from their related vehicle axles than the related banking arm ball and socket joints, are carried by the superstructure from below and shear deformation operated by the related arms of the respective separate support members from above.

6. The vehicle of claim 1, wherein the suspension and the related resilient support means for the superstructure also comprise at least one transversely extending sway bar carried by the superstructure and operated by a pair of inclined sway bar shackles connecting the outer ends of substantially longitudinally extending sway bar arms to the related rigid axle structure, and wherein the suspension means additionally comprise a tie-rod operably extending longitudinally between one roll banking arm in the front of the vehicle and one rear roll banking arm to secure track holding of the pairs of the front wheels relative to the rear wheels.

7. The invention of claim 4, wherein the centers of said superstructure carried multiturn cushions are geometrically positioned to have their centers of rotation located along the related vehicle banking axis, which also intersects the center of the related superstructure supported banking arm ball and socket joint, with the center of rotation for the multiturn cushion carried by the superstructure from above located a selected distance above the center of said ball and socket joint and the center of rotation for the multiturn cushion carried by the superstructure from below located a selected distance below the center of said ball and socket joint, in order to secure substantially equal distance from the roadbed for both multiturn cushions of the related pair and for the related ball and socket joint.

8. The invention of claim 2, wherein the superstructure supported multiturn cushions are shaped along arcs, the centers of which substantially coincide with the centers of rotation for each cushion as positioned along the related banking arm axis, in order to secure the desired symmetrical inclined travel arcs for the axle-supported banking arm ball joints effective during the curvebank roll of the superstructure, and in effect position the superstructure secondary roll center to coincide essentially with the location of the mass center of the superstructure.

9. The vehicle of claim 1, wherein the banking axis for each roll banking arm, extending through the corresponding superstructure supported ball and socket joint is disposed substantially in a vertical plane containing the center of said ball and socket joint and the center of the road contact point for the wheel on the opposite side of the vehicle, and is inclined upwardly and forwardly from said ball and socket joint to intersect the central vertical longitudinal plane of the superstructure at the approximate heighth of the center of mass of the superstructure, whereby the torsional windup of the superstructure supported end of said resilient spring means of each banking arm effected by an upward movement of the related wheel relative to the superstructure is rotationally over the torsional axis of said spring means toward the central vertical longitudinal plane of the superstructure, and which is compensated in part by windup of the axle supported end of said related spring means in the same direction to the extent that the axle is tilted by said wheel movement, the axle tilt spring windup for the banking arm on the opposite side of the superstructure tending at the same time to lift the superstructure on that side whereby there is a tendency for the superstructure to remain more nearly level when one wheel is moving upwardly relative to the superstructure.

10. The vehicle of claim 1, wherein the banking axis for each roll banking arm extending through the corresponding superstructure supported ball and socket joint is disposed substantially in a vertical plane containing the center of said ball and socket joint and the center of the road contact point for the wheel on the opposite side of the vehicle, and is inclined upwardly and forwardly from said ball and socket joint to intersect the central vertical longitudinal plane of the superstructure at the approximate height of the center of mass of the superstructure, wherein the multiturn cushions and their related operating and carrier plates are each essentially rectangular cushion block and plate pairs, each pair formed by two half-cushion sections positioned inclined to each other with the center of each half-cushion located along the designed travel path for the banking turn travel of the superstructure into its roll banked position.

11. In a vehicle of the class described having a plurality of cooperating longitudinal torsionally operated roll banking arms supporting at least a portion of the superstructure upon a rigid axle, a ball and socket joint connecting the inner end of each banking arm to the superstructure; and a support half arm extending from the inner end of each banking arm and operative against a multiturn cushion oppositely supported by the superstructure relation to variations in torsional stressing of the corresponding banking arm; the improvement characterized by positioning of the multiturn cushion generally along an axis line passing through the center of the ball and socket joint and through the central district of the related axle structure with the cushion spaced from the ball and socket joint.

* * * * *

UNITED STATES PATENT AND TRADEMARK OFFICE
CERTIFICATE OF CORRECTION

PATENT NO. : 3,901,529
DATED : August 26, 1975
INVENTOR(S) : Joachim Kolbe

It is certified that error appears in the above-identified patent and that said Letters Patent are hereby corrected as shown below:

Column 2, line 3, After "ball" insert --and--
Column 2, line 39, Delete "arm" and substitute therefor --arms--
Column 3, line 18, Delete "or" and substitute therefor --of--
Column 3, line 52, Delete "cushions" and substitute therefor --cushion--
Column 3, line 64, After "right-hand" insert --half--
Column 3, line 65, After "the" and before "end" insert --rear--
Column 5, line 24, Delete "up" and substitute therefor --an--
Column 5, line 38, Delete "responses" and substitute therefor --response--
Column 6, line 11, Delete "tie-roe" and substitute therefor --tie-rod--
Column 6, line 12, After "ball" insert --and--
Column 6, line 16, Delete "ed" and substitute therefor --end--
Column 6, line 26, Delete "shackies" and substitute therefor --shackles--
Column 6, line 56, Delete "bankiing" and substitute therefor --banking--
Column 7, line 46, Delete "defomration" and substitute therefor --deformation--
Column 12, line 26, Delete "vetical" and substitute therefor --vertical--
Column 13, line 4, Delete "muliturn" and substitute therefor --multiturn--
Column 13, line 41, Delete "side lever" and substitute therefor --support half--
Column 13, line 47, Delete "side" and substitute therefor --half--
Column 13, line 52, Delete "side" and substitute therefor --half--

Signed and Sealed this twentieth Day of January 1976

[SEAL]

Attest:

RUTH C. MASON
Attesting Officer

C. MARSHALL DANN
Commissioner of Patents and Trademarks